United States Patent Office 2,917,376
Patented Dec. 15, 1959

2,917,376
FUEL OIL COMPOSITION

Verner L. Stromberg, Shrewsbury, and Alvin Howard Smith, Glendale, Mo., assignors to Petrolite Corporation, Wilmington, Del., a corporation of Delaware No Drawing. Application August 3, 1955
Serial No. 526,328

5 Claims. (Cl. 44—63)

The present invention pertains to the improvement of hydrocarbon fuels. This has been accomplished in a number of ways. One solution of the problem involves the addition of surface-active glyoxalidines and certain derivatives thereof. See U.S. Patent 2,553,183, dated May 15, 1951, to Caron et al. We have found that certain sulfo derivatives of cyclic amidines and the like are particularly effective for this type of hydrocarbon fuel improvement. See the copending application, Serial No. 526,327, to A. H. Smith, dated August 3, 1955, which is concerned with sulfonated cyclic amidines. For convenience what is said hereinafter in regard to this invention will be stated in substantially the same terminology as employed in aforementioned U.S. Patent 2,553,183.

Thus more specifically this invention pertains to the improvement of hydrocarbon fuels, and more particularly to fuel oil compositions capable of preventing or inhibiting the sludging and/or clogging tendencies generally exhibited by hydrocarbon fuels, such as those utilized in burner systems, tanks, Diesel and combustion engines, and other industrial and domestic equipment. In addition, this invention relates to fuel oil compositions capable of removing preformed deleterious matter from filters, screens, and the like which deleterious matter is formed by deterioration and/or the presence of foreign bodies (e.g. water) in the fuel oils.

Hydrocarbons, such as distillate fuels, for example, those having a normal distillation range of from about 300° F. to about 700° F., and particularly those from about 340° F. to about 640° F., generally have a marked tendency to deteriorate under oxidizing conditions, and to form sludge. Also, the presence of impurities in such fuels, such as the presence of moisture, dispersed water, organic and/or inorganic foreign matter, and the like, causes the formation of insoluble products which tend to settle out and adhere to surfaces with which they come in contact, thereby in turn, causing clogging or plugging of filters, strainers, screens, conduit lines, and the like, of the equipment in which they are used. This necessitates frequent cleaning and even replacement of parts, thereby markedly decreasing the performance efficiency of various equipment which utilizes such fuel oils.

The problem of screen clogging is common, particularly in domestic fuel oil systems employing distillate fuel oils produced by distilling or cracking of petroleum, which fuels are characterized by their relatively low viscosity and other properties. Fuel oils of this type generally conform to the specifications set forth in Commercial Standards C.S. 12–40 for Nos. 1, 2 and 3 fuel oils. Petroleum distillates within the ranges specified and which generally do not exceed 700° F., and preferably are below 675° F., for use as diesel fuels, are further examples of the type of oils which under conditions described herein have a tendency to clog screens or filters, particularly when such fuels contain minor amounts of water dispersed therein.

Another place where screen clogging and plugging of conduit lines is encountered is in fuel oil storage tanks, which latter may be connected to burner systems or engines, etc. The stored fuel generally comes in contact with air, moisture, etc., which cause formation and precipitation of sludge materials, the latter depositing on and clogging the screens or filters used for protecting the burners or engines using such fuel oils.

It is an object of this invention to inhibit sludging tendencies of hydrocarbon fuel oils. It is another object to inhibit sludging and precipitation of contaminants in hydrocarbon distillate fuel oils, particularly in cracked hydrocarbon fuels. It is still another object to provide distillate fuel oils, particularly fuel oils obtained during cracking of hydrocarbons, which fuel oils have excellent performance characteristics with respect to freedom from screen clogging, even after extensive storage under oxidizing conditions and in the presence of water. Still another object is to provide a distillate fuel oil composition which is effective in removing preformed sludge deposits formed in fuel oil systems. Still another object is to provide a particular type of distillate fuel oil composition or a blend thereof, which is non-corrosive, stable, and effective for removing sludge and for cleaning metal surfaces.

The above and other objects of this invention may be attained by dispersing, admixing with or dissolving in hydrocarbon fuel oils (which normally have a tendency to cause clogging or plugging of screens or the like), a minor amount, which amount, however, is sufficient to inhibit said tendencies, of one or more surface-active sulfonated cyclic amidines, and derivatives thereof. If desired, a minor amount of a detergent and/or solutizer may also be added to the composition.

The hydrocarbon distillate fuel oils in which the active ingredient and/or ingredients of this invention are dispersed or dissolved may be treated or untreated cracked fuel oils, or mixtures of cracked fuels with straight run fuel oils, said fuel oils having components normally distilling from about 300° F. to about 700° F. Preferred fuels have a boiling range of from about 340° F. to about 700° F., and particularly from about 400° F. to about 675° F. Specifically, hydrocarbon distillates which are utilized as bases in compositions of this invention are cracked gas oils, fuel oils, furnace oils, burner oils, diesel fuel oils, kerosene, etc., or mixtures of said cracked fuels with the corresponding or like straight run hydrocarbon fractions.

The present invention is concerned with reaction products obtained by reacting cyclic amidines and certain cyclic amidine derivatives with a sulfonating agent which introduces organically combined sulfur as differentiated from the salt form. The sulfonating agent is sulfur trioxide and the cyclic amidines which may be employed are characterized obviously by being reactive towards sulfur trioxide. Such reactivity may depend on the presence of one or more functional groups. For instance, the presence of a primary or secondary amino group; the presence of a hydroxyalkyl radical; the presence of an unsaturated fatty acid radical, or the residual radical derived therefrom; or in some instances possibly a hydrogen atom attached to carbon is susceptible to reaction.

It is our preference to employ cyclic amidines and cyclic amidine derivatives having at least one primary or secondary amino radical. Under such circumstances we believe that regardless of what else may be formed there is formed a product which may be considered as a substituted sulfamic acid.

For instance, if one prepares a conventional imidazoline from diethylene triamine and a higher fatty acid and particularly a saturated higher fatty acid and then reacts the imidazoline so obtained with sulfur trioxide, the subsequent result may be a series of reactions but there seems to be evidence that the initial reaction yields a sulfamic acid, $HSO_3NHR$. The substituted sulfamic acid so formed probably can be depicted better as a salt form showing both a positive charge and a negative charge. Briefly, one might speculate that the step involved is as follows:

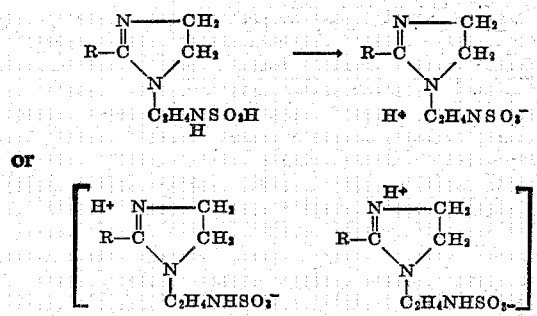

In conducting such reaction involving sulfur trioxide and cyclic amidines, or cyclic amidine derivatives herein described, the reaction is conducted at a temperature below pyrolysis and in such a manner that the resultant product or cogeneric mixture resulting from reaction is solvent soluble. Stated another way, the products so obtained, or their salts, must be solvent-soluble and particularly in an organic solvent. The present invention is not concerned with solvent-insoluble products or the like which may be obtained by some peculiar sulfonation procedure involving sulfur trioxide.

In any event, having obtained a single reactant or a cogeneric mixture of the kind previously described, said products must be solvent-soluble, either in water, or in any organic solvent, which may be a hydrocarbon solvent, or an oxygenated solvent, or a mixture of such solvents. This applies to the product as such or the salt form as, for example, after total or partial neutralization with acetic acid, glycolic acid, lactic acid, gluconic acid, or the like. Thus, such products and the salts may be dissolved in benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleums, etc., may be employed as diluents. One may use solvents having a common solvent effect, such as the methyl, ethyl, propyl and butyl ethers of various glycols, diglycols and triglycols, such as the ethers corresponding to ethyleneglycol, diethyleneglycol, triethyleneglycol, propyleneglycol, dipropyleneglycol, tripropyleneglycol, butyleneglycol, dibutyleneglycol, tributyleneglycol, etc. Moreover, as previously pointed out one can use mixtures of one or more of these solvents but in any event the product as such, or in the salt form as noted, must be organic solvent-soluble.

In addition to the other objectives of the present invention it is also to be noted that one objective of this invention is to provide hydrocarbon fuel oils of improved stability against the formation of undesirable color bodies as well as the development and settling out of insoluble materials in storage. Furthermore, the presence of the additive in the fuel oil tends to "fluidize" old sludge deposits.

Briefly stated, then, the present invention is concerned in its preferred form with the improvement of a fuel oil by the addition of a sulfur trioxide-reacted member of the class consisting of cyclic amidines and cyclic amidine derivatives. Said amidines and cyclic amidine derivatives are derived exclusively from polyamines and monocarboxy acids having not over 22 carbon atoms, and dicarboxy acids, some of which may have 36 carbon atoms or more.

For purpose of convenience, what is said hereinafter is divided into eight parts:

Part 1 is concerned with a general description of cyclic amidines and cyclic amidine derivatives of the kind herein employed for reaction with sulfur trioxide;

Part 2 is concerned with suitable polyamines which may be employed to produce the cyclic amidines and cyclic amidine derivatives;

Part 3 is concerned with suitable monocarboxy acids which may be employed in producing the cyclic amidines;

Part 4 is concerned with suitable dicarboxy acids which may be employed in the production of cyclic amidines and cyclic amidine derivatives;

Part 5 is concerned with a typical number of cyclic amidines and cyclic amidine derivatives which may be subjected to reaction with sulfur trioxide;

Part 6 is concerned with the reaction between cyclic amidines and sulfur trioxide in order to introduce combined sulfur in organic form as differentiated from salt formation;

Part 7 is concerned with combinations of the products described in Part 6, preceding, with either low molal acids or high molal acids as, for example, higher fatty acids or detergent-forming acids so as to form salts; and Part 8 is concerned with the improvement of hydrocarbon fuels by means of the addition of products described in Parts 6 and 7 preceding.

PART 1

Cyclic amidines can be prepared from monocarboxy acids, dicarboxy acids, or their esters. Similarly, some other obvious equivalents could be used such as the amide. This is perfectly obvious because, ignoring the first step of salt formation, when the acid is used a second step is amidification. The third step is ring formation.

The reaction between a glyceride and a polyamine is somewhat different from an acid in certain respects. In the first place salt formation does not take place. If a fatty acid is added to an amine the first step is salt formation. Such step presumably does not appear when a glyceride is used and amidification results in the formation of glycerol or the equivalent alcohol. During subsequent reaction (ring formation) it is possible that the glycerol was decomposed into an aldehyde and the aldehyde in turn may or may not react with one or more reactants having a primary or secondary amine group.

The reaction between carboxy acids and particularly higher fatty acids or their equivalents with suitable polyamines yield cyclic amidines which include tetrahydro pyramidines and imidazolines. Typical imidazolines are illustrated by the following:

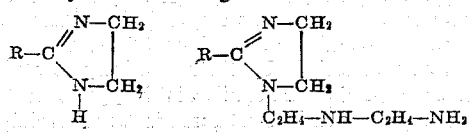

Typical tetrahydro pyramidines are the following:

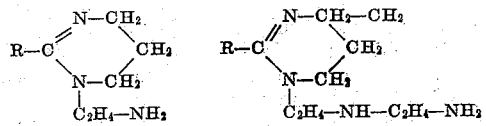

Similarly, cyclic amidines may be derived from a single polyalkylene amine and two molecules capable of furnishing the group R. This is illustrated by the following formula:

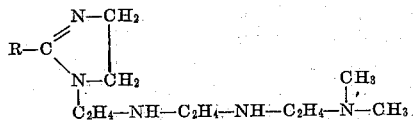

Cyclic amidines also may contain a basic tertiary amino group as illustrated by the following:

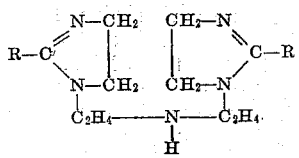

The preparation of imidazolines substituted in the 2-position (the position occupied by R in the above structural formulas) by aliphatic hydrocarbon radicals is described in the literature. It is readily carried out by reacting a monocarboxylic aliphatic acid or its ester or amide with a polyamine, said amine containing at least one primary amino group plus at least one secondary amino group or a second primary amino group, separated from said first primary amino group by 2 carbon atoms.

For details of preparation of imidazolines substituted in the 2-position and made from amines of this type see the following U.S. Patents: U.S. Patent No. 1,999,989, dated April 30, 1935, to Bockmuhl et al.; U.S. Patents Nos. 2,155,877 and 2,155,878, dated April 25, 1939, to Waldmann et al.

This reaction is generally carried out by heating the reactants at a temperature of 230° C. or higher, usually within the range of 250–300 C., at which temperatures water is evolved and ring closure is effected. For details of the preparation of tetrahydropyrimidines, see German Patent No. 700,371, dated December 18, 1940, to Waldmann et al.; German Patent No. 701,322, dated January 14, 1941, to Miescher et al.; and U.S. Patent No. 2,194,419, dated March 19, 1940, to Chwala.

Reference is made also to aforementioned U.S. Patent No. Re. 23,227, to Blair et al., reissued May 9, 1950; and U.S. Patent No. 2,589,198, to Monson, dated April 11, 1952, for other examples of cyclic amidine materials of the present class. For certain of the 6-membered ring compounds, herein termed tetrahydropyrimidine compounds, see U.S. Patent No. 2,534,826, to Mitchell et al., dated December 19, 1950.

Over and above what appears in the patent literature, reference is made to "Imidazole and its Derivatives, Part I," Hofmann, Interscience Publishers, Inc., New York, 1953. See also Chemical Reviews, volume 54, pages 593, 613 (1954).

The manufacture of cyclic amidines depends essentially on the use of a temperature above the point of amidification and below the point of pyrolysis. The temperature involved in ring formation, of course, depends in part whether or not vacuum is employed to remove volatile material or perhaps whether or not a dried inert gas, such as nitrogen, is passed through during the reaction period. There is also a variation depending on whether or not one is attempting to make an amino imidazoline, an amido imidazoline, a diamido imidazoline, or the like. What is said in regard to the 5-membered ring compounds applies also to the 6-membered ring compounds although such derivatives are of lesser importance for reasons of economy, as previously noted.

Although cyclic amidines and cyclic amidine derivatives can be prepared in acceptable technical purity in many instances it is advantageous to conduct a reaction so that one obtains a cogeneric mixture of cyclic amidine and cyclic amidine derivatives rather than attempt to obtain a single amidine or single amidine type. Such mixed compositions are just as suitable for the herein described purpose as a single type of reactant in the absence of others. Although the specific type are described in detail substantially the following examples illustrate well known procedures in which cogeneric mixtures are obtained and which can be employed without any effort towards separation. In such cogeneric mixtures one can obviously use a combination of more than one polyamine or if desired a combination of more than one acid equivalent, as for example a mixture of triethylene tetramine and tetraethylene pentamine in combination with a mixture of equal parts of soybean oil and castor oil.

*Example 1aa*

The cyclic amidine was prepared in a conventional stainless steel reactor. The reactor was equipped with an agitator, raw material inlet, reflux and take-off condenser, thermometer, and bottom outlet. To the reactor was added 60 lb. of acetic acid. With agitator turned on, 125 lb. of a 50–50 mixture of diethylene triamine and triethylene tetramine were added. The batch warmed up spontaneously and was further heated by means of built in electrical heaters. When the temperature reached 290° C. the batch was held at this temperature for 1½ hours, and then allowed to cool back for sampling and storage. During the reacting cycle, 36 lb. of water was removed, together with traces of organic amines. The product was a medium viscous, light colored oil.

*Example 2aa*

In a reactor identical to the one described in Example 1aa, 150 lb. of Emery dimeric acid was warmed up to about 60° C. to facilitate agitation, 42 lb. of a 50–50 mixture of triethylene tetramine and tetraethylene pentamine were then run in over a 10 minute period. The batch was held at 290° C. for 1 hr. 45 min. 9.5 lb. of water was collected; and the cooled product was found to be a dark amber, viscous oil.

*Example 3aa*

As this example, 150 lb. of castor oil was used, together with a 50–50 mixture of triethylene tetramine and tetraethylene pentamine. The amount of amine used was 84 lb. About 9.5 lb. of water was taken off together with small amounts of organic oils and amines. The total reaction time was 3½ hrs., the last 1½ hr. being at 295° C. The product was a dark viscous mass.

*Example 4aa*

Conditions were the same as in Example 3aa, except that a small stream of nitrogen was employed to help remove water. 152 lb. of soyabean oil was charged, together with 26 lb. of diethylene triamine and 48 lb. of tetraethylene pentamine. The product was a medium dark, viscous mass. 10 lb. of aqueous distillate was obtained.

162 lb. of crude tall oil was mixed with the same amounts of amines used in Example 4aa. Conditions were also identical. 17 lb. of aqueous distillate was obtained.

Example 6aa

A mixture consisting of 76 lb. of soyabean oil and 75 lb. castor oil was reacted with 73 lb. of triethylene tetramine. Conditions were set as in Example 3aa, and 9 lb. of water was collected. The product was similar to that of Examples 3aa and 4aa.

Example 7aa

As in Example 3aa, 150 lb. castor oil was treated with 48 lb. of tetraethylene pentamine. In this case, the castor oil represents two moles of fatty acid to one mol of amine. After 2 hrs. at 300° C., 8 lb. of aqueous distillate had been collected. The cooled product was a semi-solid dark mass.

Example 8aa 76 lb. of soyabean oil and 75 lb. of castor oil were charged, together with 37 lb. of triethylene tetramine and 48 lb. of tetraethylene pentamine. This mixture was held at 295° C. for 2 hrs. and then cooled. 9.5 lb. of aqueous distillate was evolved. The product was similar to others described in this series of examples.

PART 2

Examples of polyamines which may be suitably employed as reactants to produce the nitrogen-containing compounds of the present invention include the polyalkylene polyamines, such as ethylenediamine, diethylenetriamine, triethylenetetramine, tetraethylenepentamine, and higher polyethylene polyamines. They also include 1,2-diaminopropane, N-ethylethylenediamine, N,N-dibutyldiethylenetriamine, 1,2-diaminobutane, hydroxyethylethylenediamine, 1,3-propylenetriamine, and the like.

Equally suitable for use in preparing those compounds of our invention which are tetrahydropyrimidines substituted in the 2-position are the polyamines containing at least one primary amino group and at least one secondary amino group or a second primary amino group, separated from said first primary amino group by 3 carbon atoms.

Examples of amines suitable for this synthesis include 1,3-propylenediamine, 1,3-diaminobutane, 2,4-diaminopentane, N-aminoethyltrimethylenediamine, tripropylenetetramine, tetrapropylenepentamine, high-boiling polyamines prepared by the condensation of 1,3-propylene dichloride with ammonia, and similar polyamines in which there occurs at least one primary amino group separated from another primary or secondary amino group by carbon atoms.

Other than the usually available ethylene polyamines and the derivatives thereof obtained by treating one mole of amine with one mole of an alkylene oxide, such as ethylene oxide, propylene oxide, butylene oxide, glycide, styrene oxide, etc., there are available commercial compounds such as 1,2-diaminopropane, 1,3-diaminobutane, and 3,3'-iminobispropylamine. Such compounds, of course, also can be reacted with a mole of the alkylene oxides previously noted.

Various polyamines of somewhat different structure can be obtained by reacting monoamines or polyamines with alkylene imine, such as ethylene imine, propylene imine, etc. The amines so obtained having in some instances two different radicals uniting various nitrogen atoms also can be treated with alkylene oxides as previously noted. In essence, any one of a number of suitable polyamines are acceptable provided the structure contains a primary amino group and a secondary amino group separated by at least two and not more than three carbon atoms provided that side chains or some other functional group does not interfere with ring formation.

In the hereto appended claims reference to polyalkylene amines includes all such amines which are functionally capable of forming cyclic amidines as, for example, polyamides in which one or two terminal groups have been replaced by a hydroxyalkyl radical or by an alkyl radical or the like. Obviously in the case of a diamide only one terminal group can be so converted. In the case of amines having 3 or more nitrogen atoms, both terminal groups could be converted. This applies regardless of whether the products form 5-membered rings or 6-membered rings.

PART 3

The acid which may be employed can be a high molal monocarboxy detergent-forming acid, such as a saturated or unsaturated aliphatic acid having at least 8 or not over 32 carbon atoms, a naphthenic acid, a rosin acid, an acid obtained from the oxidation of wax, or the like. Suitable acids are caprylic, capric, stearic, oleic ricinoleic lauric, palmitic, hydroxystearic, abietic, hydroabietic, fatty acids derived from animal or vegetable sources, for example, cocoanut oil, rapeseed oil, palm oil, olive oil, cottonseed oil, fish oils, etc. Such acids combine with soluble bases, such as caustic soda or caustic potash, to give soap or detergent-like materials.

Although many of the examples herein described are derivatives of high molal acids for the reason that such radicals add oil solubility as well as other desirable characteristics, it is to be emphasized in the broadest aspect the present invention includes the use of low molal acids such as acetic acid, glycolic acid, lactic acid, butyric acid, phthalic anhydride, benzoic acid, diglycolic acid and the like. Products obtained from such low molal acids are of definite interest as such and also as admixtures of similar derivatives derived from high molal acids.

PART 4

The dicarboxy acids which may be employed in the manufacture of the cyclic amidines may be high molal or low molal. An example of the high molal acids are dimerized fatty acids. A complete description appears in aforementioned U.S. Patent No. 2,632,695. Purely by way of illustration reference is made to two formulas which depict common dimerized acids, as follows:

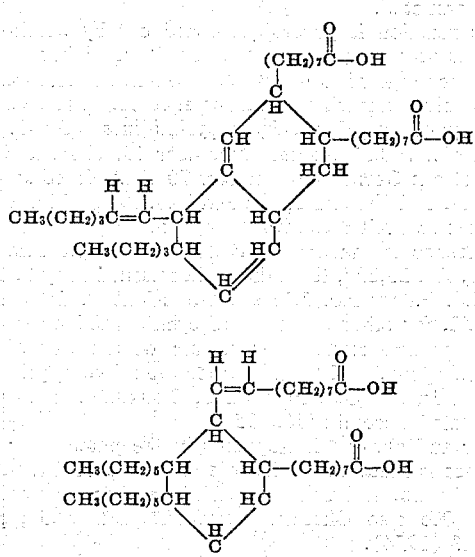

The acids produced commercially run approximately 85% or better dimer content with some trimer and some monomer. As pointed out in said aforementioned U.S. Patent No. 2,632,695 a well known source of these dimeric acids is the product sold by Emery Industries, Inc., and said to be dilinoleic acid.

In the literature published by the Emery Industries, Inc., the properties of this product are given as follows:

Neutral equivalent _____ 290–310.
Iodine value _____ 80–95.
Color _____ Gardner 12 (max.).
Dimer content _____ Approx. 85%.
Trimer and higher _____ Approx. 12%.
Monomer _____ Approx. 3%.

Low molal dicarboxy acids include diglycolic acid, adipic acid, sebacic acid, isosebacic acid, phthalic acid, maleic acid, malonic acid, azelaic acid, ethylene bis glycolic acid, and nadic anhydride, etc.

PART 5

Typical amino imidazolines are shown in the following table:

Table I

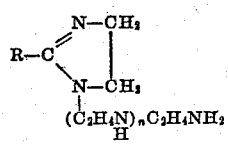

| Ex. No. | R | n |
|---|---|---|
| 1a | $CH_3$ | 2 |
| 2a | $C_2H_5$ | 0 |
| 3a | $C_3H_7$ | 1 |
| 4a | $C_6H_{13}$ | 2 |
| 5a | $C_8H_{17}$ | 0 |
| 6a | $C_{13}H_{27}$ | 1 |
| 7a | $C_{15}H_{31}$ | 2 |
| 8a | $C_{17}H_{35}$ | 0 |
| 9a | $C_{19}H_{39}$ | 1 |
| 10a | $C_{21}H_{43}$ | 2 |
| 11a | $C_{13}H_{25}$ | 0 |
| 12a | $C_{15}H_{29}$ | 1 |
| 13a | $C_{17}H_{33}$ | 2 |
| 14a | $C_{19}H_{37}$ | 0 |
| 15a | $C_{21}H_{41}$ | 1 |
| 16a | $C_{17}H_{33}O$ | 2 |
| 17a | $C_{17}H_{31}$ | 0 |
| 18a | $C_{17}H_{29}$ | 1 |
| 19a | $C_{17}H_{27}$ | 2 |
| 20a | $C_{19}H_{31}$ | 0 |
| 21a | $C_{21}H_{35}$ | 1 |
| 22a | $C_{17}H_{35}$ | 2 |
| 23a | $C_{17}H_{33}$ | 0 |
| 24a | $C_{17}H_{31}$ | 1 |
| 25a | $C_{17}H_{29}$ | 2 |

Typical amido imidazolines are shown in Table II.

Table II

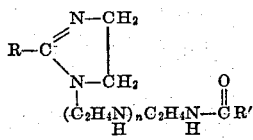

| Ex. No. | R | R' | n |
|---|---|---|---|
| 1b | $CH_3$ | $CH_3$ | 2 |
| 2b | $C_2H_5$ | $C_2H_5$ | 0 |
| 3b | $C_3H_7$ | $C_3H_7$ | 1 |
| 4b | $C_6H_{13}$ | $CH_3$ | 2 |
| 5b | $C_8H_{17}$ | $C_8H_{17}$ | 0 |
| 6b | $C_{13}H_{27}$ | $C_{13}H_{27}$ | 1 |
| 7b | $C_{15}H_{31}$ | $C_{15}H_{31}$ | 2 |
| 8b | $C_{17}H_{35}$ | $C_{17}H_{35}$ | 0 |
| 9b | $C_{19}H_{39}$ | $C_{17}H_{35}$ | 1 |
| 10b | $C_{21}H_{43}$ | $C_{21}H_{43}$ | 2 |
| 11b | $C_{13}H_{25}$ | $C_{13}H_{25}$ | 0 |
| 12b | $C_{15}H_{29}$ | $C_{15}H_{29}$ | 1 |
| 13b | $C_{17}H_{33}$ | $C_{17}H_{33}$ | 2 |
| 14b | $C_{19}H_{37}$ | $C_{19}H_{37}$ | 0 |
| 15b | $C_{21}H_{41}$ | $C_{21}H_{41}$ | 1 |
| 16b | $C_{17}H_{33}O$ | $C_{17}H_{33}O$ | 2 |
| 17b | $C_{17}H_{31}$ | $C_{17}H_{31}$ | 0 |
| 18b | $C_{17}H_{29}$ | $C_{17}H_{29}$ | 1 |
| 19b | $C_{17}H_{27}$ | $C_{17}H_{27}$ | 2 |
| 20b | $C_{19}H_{31}$ | $C_{19}H_{31}$ | 0 |
| 21b | $C_{21}H_{35}$ | $C_{21}H_{35}$ | 1 |
| 22b | $C_{17}H_{35}$ | $C_8H_{17}$ | 2 |
| 23b | $C_{17}H_{33}$ | $C_{17}H_{33}$ | 0 |
| 24b | $C_{17}H_{31}$ | $C_{17}H_{31}$ | 1 |
| 25b | $C_{17}H_{29}$ | $C_{17}H_{29}$ | 2 |

Examples of amino imidazolines and amido imidazolines in which there is a hydroxyl alkyl radical subject to sulfation is illustrated by Table III following:

Table III

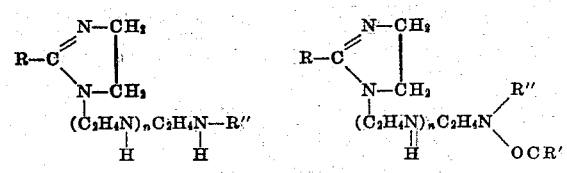

| Ex. No. | n | R | R' | R'' |
|---|---|---|---|---|
| 1c | 0 | $C_{13}H_{27}$ | | $C_2H_4OH$ |
| 2c | 1 | $C_{17}H_{35}$ | | $C_3H_6OH$ |
| 3c | 2 | $C_{19}H_{39}$ | | $C_4H_8OH$ |
| 4c | 0 | $C_{13}H_{25}$ | | $C_2H_4OH$ |
| 5c | 1 | $C_{17}H_{33}$ | | $(C_2H_4O)_2H$ |
| 6c | 2 | $C_{17}H_{33}O$ | | $(C_2H_4O)_3H$ |
| 7c | 0 | $C_{21}H_{41}$ | | $C_3H_6OH$ |
| 8c | 1 | $C_{13}H_{27}$ | | $(C_3H_6O)_2H$ |
| 9c | 2 | $C_{17}H_{35}$ | | $C_4H_8OH$ |
| 10c | 0 | $C_{19}H_{39}$ | | $C_2H_4OH$ |
| 11c | 1 | $CH_3$ | | $C_3H_6OH$ |
| 12c | 2 | $C_2H_5$ | | $C_4H_8OH$ |
| 13c | 0 | $C_3H_7$ | | $(C_3H_6O)_2H$ |
| 14c | 1 | $C_2H_5O$ | | $(C_3H_6O)_3H$ |
| 15c | 2 | $C_4H_9$ | | $(C_4H_8O)_2H$ |
| 16c | 0 | $C_{13}H_{27}$ | $C_{13}H_{27}$ | $C_2H_4OH$ |
| 17c | 1 | $C_{17}H_{35}$ | $C_{17}H_{35}$ | $C_3H_6OH$ |
| 18c | 2 | $C_{19}H_{39}$ | $C_{19}H_{39}$ | $C_4H_8OH$ |
| 19c | 0 | $C_{13}H_{25}$ | $C_{13}H_{25}$ | $C_2H_4OH$ |
| 20c | 1 | $C_{17}H_{33}$ | $C_{17}H_{33}$ | $(C_2H_4O)_2H$ |
| 21c | 2 | $C_{17}H_{33}O$ | $C_{17}H_{33}O$ | $(C_2H_4O)_3H$ |
| 22c | 0 | $C_{21}H_{41}$ | $C_{21}H_{41}$ | $C_3H_6OH$ |
| 23c | 1 | $C_{13}H_{27}$ | $C_{13}H_{27}$ | $(C_3H_6O)_2H$ |
| 24c | 2 | $C_{17}H_{35}$ | $C_{17}H_{35}$ | $C_4H_8OH$ |
| 25c | 0 | $C_{19}H_{39}$ | $C_{19}H_{39}$ | $C_2H_4OH$ |
| 26c | 1 | $CH_3$ | $CH_3$ | $C_3H_6OH$ |
| 27c | 2 | $C_2H_5$ | $C_2H_5$ | $C_4H_8OH$ |
| 28c | 0 | $C_3H_7$ | $C_3H_7$ | $(C_3H_6O)_2H$ |
| 29c | 1 | $C_2H_5O$ | $C_2H_5O$ | $(C_3H_6O)_3H$ |
| 30c | 2 | $C_4H_9$ | $C_4H_9$ | $(C_4H_8O)_2H$ |

Imidazolines having two rings and obtained from dicarboxy acids are illustrated on Table IV immediately following.

Table IV (1d)

$$\begin{array}{c} H_2C-N \\ | \quad \quad \quad \diagdown \\ H_2C-N \end{array} C-CH_2COCH_2C \begin{array}{c} N-CH_2 \\ \diagup \quad \quad \quad | \\ N-CH_2 \end{array}$$
$$C_2H_4NH_2 \quad \quad \quad \quad \quad C_2H_4NH_2$$

(2d)

$$\begin{array}{c} CH_2-N \\ | \quad \quad \quad \diagdown \\ CH_2-N \end{array} C(CH_2)_2C \begin{array}{c} N-CH_2 \\ \diagup \quad \quad \quad | \\ N-CH_2 \end{array}$$
$$H_2NC_2H_4NC_2H_4 \quad \quad \quad C_2H_4NC_2H_4NH_2$$
$$\quad \quad H \quad \quad \quad \quad \quad \quad \quad \quad H$$

(3d)

$$\begin{array}{c} CH_2-N \\ | \quad \quad \quad \diagdown \\ CH_2-N \end{array} C(CH_2)_4C \begin{array}{c} N-CH_2 \\ \diagup \quad \quad \quad | \\ N-CH_2 \end{array}$$
$$C_2H_4NH_2 \quad \quad \quad \quad \quad C_2H_4NC_2H_4NH_2$$
$$\quad \quad \quad \quad \quad \quad \quad \quad \quad \quad H$$

(4d)

$$\begin{array}{c} H_2C-N \\ | \quad \quad \quad \diagdown \\ H_2C-N \end{array} C(CH_2)_4C \begin{array}{c} N-CH_2 \\ \diagup \quad \quad \quad | \\ N-CH_2 \end{array}$$
$$\quad O \quad \quad \quad \quad \quad \quad \quad \quad \quad \quad \quad O$$
$$\quad \| \quad \quad \quad \quad \quad \quad \quad \quad \quad \quad \quad \| $$
$$HOOC(CH_2)_4CNC_2H_4 \quad \quad C_2H_4NC(CH_2)_4COOH$$
$$\quad \quad \quad \quad H \quad \quad \quad \quad \quad \quad \quad H$$

(5d)

$$\begin{array}{c} H_2C-N \\ | \quad \quad \quad \diagdown \\ H_2C-N \end{array} C(CH_2)_8C \begin{array}{c} N-CH_2 \\ \diagup \quad \quad \quad | \\ N-CH_2 \end{array}$$
$$H_2NC_2H_4NC_2H_4NC_2H_4 \quad \quad C_2H_4NC_2H_4NC_2H_4NH_2$$
$$\quad \quad H \quad \quad \quad \quad H \quad \quad \quad \quad \quad \quad H \quad \quad \quad H$$

(6d) 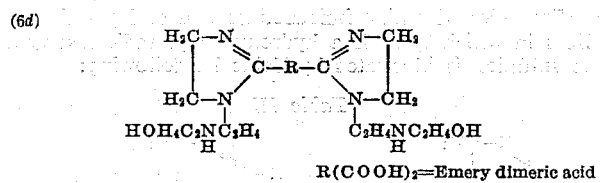
R(COOH)₂=Emery dimeric acid (7d) 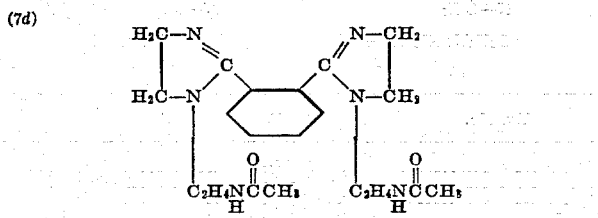

(8d) 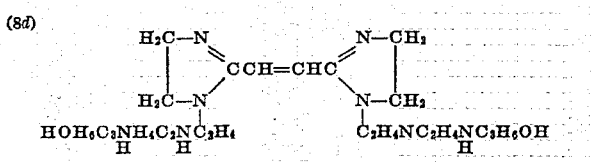

(9d) 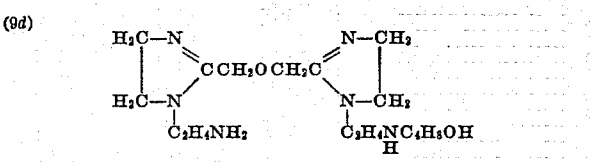

(10d) 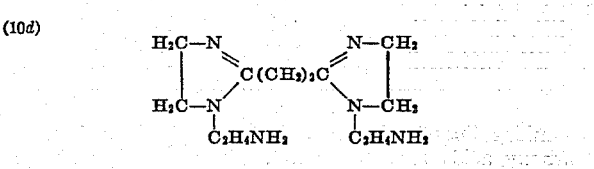

(11d) 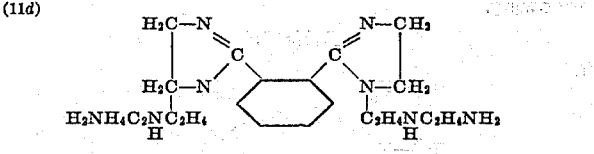

(12d) 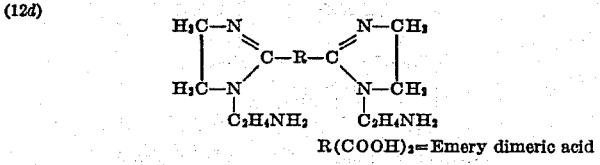
R(COOH)₂=Emery dimeric acid (13d) 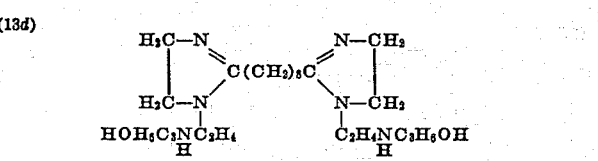

(14d) 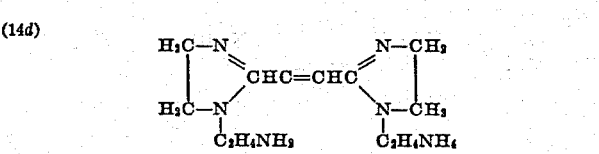

(15d) 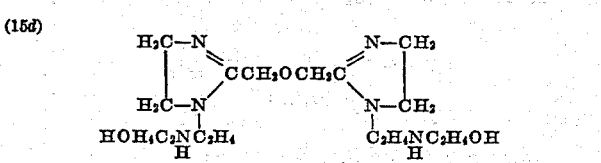

(16d)

$$H_2C-N \quad N-CH_2$$
$$\phantom{xxx}C\phantom{xxxx}C$$
$$H_2C-N \quad\quad\quad N-CH_2$$
$$HOH_8C_4NC_2H_4 \quad C_2H_4NC_4H_8OH$$
$$\phantom{xx}H\phantom{xxxxxxxxxxxxxxx}H$$

(17d)

$$H_2C-N \quad\quad\quad N-CH_2$$
$$\phantom{xxxx}C(CH_2)_4C$$
$$H_2C-N \quad\quad\quad N-CH_2$$
$$H_2NH_4C_2NC_2H_4 \quad C_2H_4NC_2H_4OH$$
$$\phantom{xx}H\phantom{xxxxxxxxxxxxxx}H$$

(18d)

$$H_2C-N \quad N-CH_2$$
$$\phantom{xxx}C-R-C$$
$$H_2C-N \quad\quad\quad N-CH_2$$
$$H_2NH_4C_2NC_2H_4 \quad C_2H_4NC_2H_4NH_2$$
$$\phantom{xx}H\phantom{xxxxxxxxxxxxx}H$$
R(COOH)₂=Emery dimeric acid (19d)

$$H_2C-N \quad\quad\quad N-CH_2$$
$$\phantom{xxxx}C(CH_2)_8C$$
$$H_2C-N \quad\quad\quad N-CH_2$$
$$\phantom{xxxxxxx}H \quad C_2H_4NC_2H_4NH$$
$$\phantom{xxxxxxxxxxxxxxxx}H$$

(20d)

$$H_2C-N \quad\quad\quad N-CH_2$$
$$\phantom{xxxx}C(CH_2)_2C$$
$$H_2C-N \quad\quad\quad N-CH_2$$
$$\phantom{xxxxxxx}H \quad C_2H_4NC_2H_5OH$$
$$\phantom{xxxxxxxxxxxxxxx}H$$

Imidazolines derived from a single amine, i.e., tetramine and pentamine and two moles of monocarboxy acid are illustrated in Table V immediately following:

Table V $$H_2C-N \quad\quad\quad\quad N-CH_2$$
$$\phantom{xxxx}C-R \quad R'-C$$
$$H_2C-N \quad\quad\quad\quad N-CH_2$$
$$\phantom{xx}C_2H_4(NC_2H_4)_n$$
$$\phantom{xxxxx}H$$

|  | n | R | R' |
|---|---|---|---|
| (1e) | 0 | CH₃ | CH₃ |
| (2e) | 1 | C₄H₉ | C₄H₉ |
| (3e) | 2 | C₈H₁₇ | C₈H₁₇ |
| (4e) | 0 | C₁₃H₂₇ | C₁₃H₂₇ |
| (5e) | 1 | C₁₇H₃₃ | C₁₇H₃₃ |
| (6e) | 2 | C₁₇H₃₃O | C₁₇H₃₃O |
| (7e) | 0 | CH₃ | C₄H₉ |
| (8e) | 1 | C₈H₁₇ | C₁₃H₂₇ |
| (9e) | 0 | C₁₃H₂₇ | C₁₇H₃₃O |
| (10e) | 1 | C₁₃H₂₇ | C₁₇H₃₃ |

All the various compounds described previously and obtained from amines in which the nitrogen atoms are separated by two carbon atoms can also be obtained from comparable amines of a trimethylene type, i.e., where the nitrogen atoms are separated by three carbon atoms. Such tetrahydropyrimidines are more expensive than the corresponding imidazolines and for this reason more imidazolines have been illustrated, also it is preferable to use the cheaper imidazolines. Such cyclic amine and cyclic imidine derivatives are illustrated in Table VI following:

Table VI

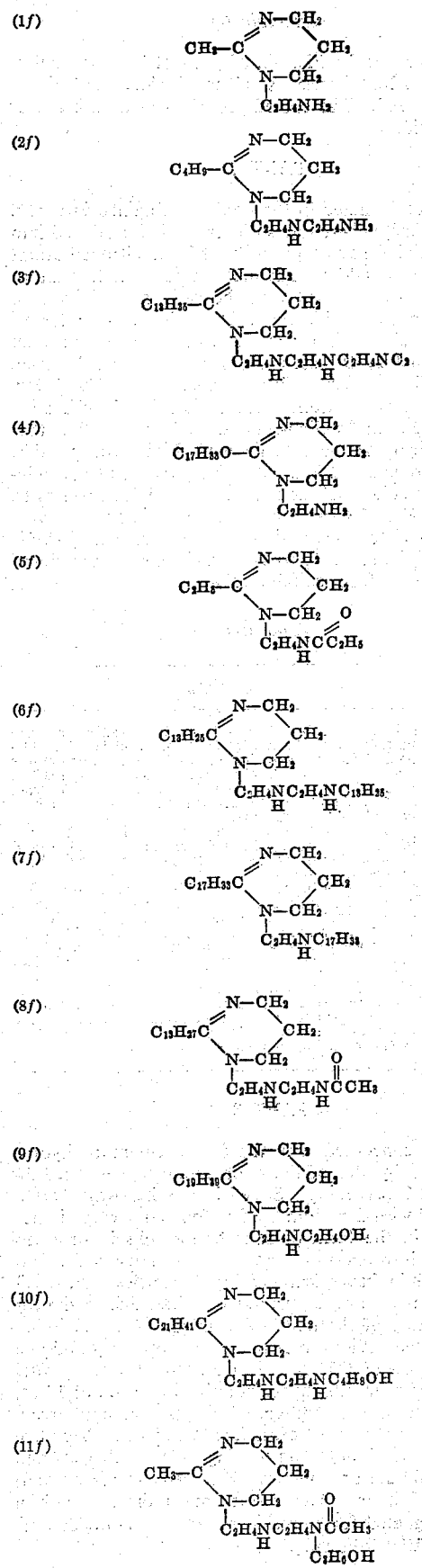
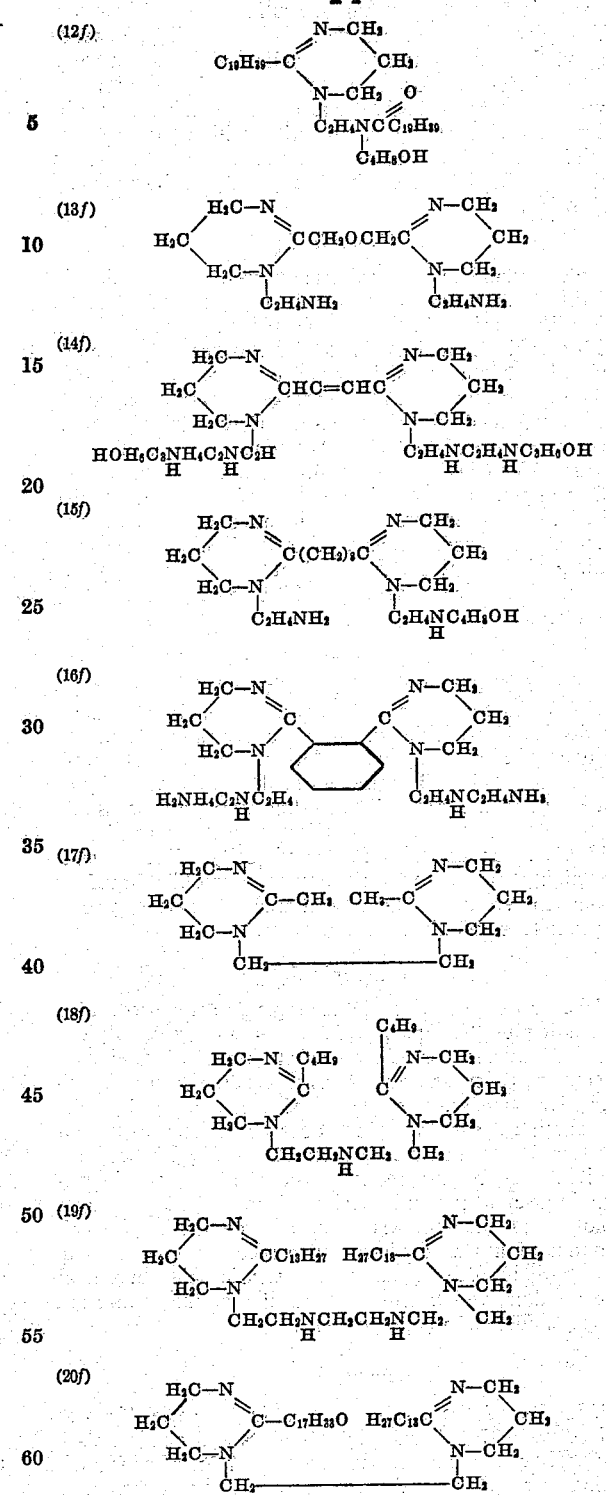

PART 6

The present invention is concerned with sulfonated cyclic amidines. No differentiation is intended in regard to whether there is introduced a sulfated group or a sulfonic group or sulfur in some other organically combined form as has been previously stated. Without attempting to differentiate between sulfation and sulfonation and using the term "sulfonating" to include both type of reactions, it is to be noted that one can obtain suitable compounds by use of sulphur trioxide or sulfuric anhydride. Salt formation is, of course, excluded for the reason that the sulphate radical or equivalent is not organically combined. The cyclic amidine may be reacted so as to introduce more than one sulfo group. Where one sulfo group is introduced there is a possibility, depending on the composition of the cyclic amidines, that some sort of inner salt formation takes place by reaction between the residual basic cyclic amidine radical or a different salt formed by combination with another cyclic amidine molecule. For practical purposes what has been said will be illustrated by the examples immediately following.

*Example 1g*

Into a stainless steel sulfonator was charged 25.4 lb. of the product from Example 1a together with 41.4 lb. of ordinary mineral spirits. The sulfonator was equipped with an agitator and gas inlet tube plus heating and cooling coils and the usual inlet and outlet valves. The gas tube was arranged so as to discharge beneath the agitator, which consisted of a simple 8-bladed turbine. The mixture was warmed to 50° C. whereupon 16 lb. of anhydrous sulfur trioxide was run in over 2-hour period. The $SO_3$ was used as a gas diluted with nine volumes of dry air. The temperature was maintained between 50 and 60° C. The product was a yellowish liquid. On evaporation of the solvent, the product was a viscous, tacky syrup. The yield was above 90% based on the $SO_3$ admitted.

*Example 2g*

The sulfonator was charged with 34.8 lb. of the product referred to in Example 23a, and 41.8 lb. of mineral spirits. Sulfur trioxide and air in a 1:9 ratio was passed in over a 45 minute period. Although 8 lb. of $SO_3$ were to be used, only 7 lb. were run in due to the viscosity of the resulting sulfonate. The starting temperature was 55° C. and the temperature was allowed to range as high as 75° C., in an effort to reduce viscosity. The solvent-containing product was an orange, immobile liquid at room temperature. The solvent free sulfonate was soluble in xylene and dispersible in water.

*Example 3g*

The product described in Example 22b was used. 23.1 lb. of it plus 28.1 lb. of xylene was employed. Xylene was used instead of mineral spirits because it exhibits a greater solvency and also tends to produce lesser viscosities. When gaseous sulfur trioxide is employed as the sulfonating agent, the xylene does not appear to be sulfonated due to the much greater $SO_3$ affinity of the cyclic amidine. 9 lb. of gaseous $SO_3$ at a 12:1 air ratio was run in over a one-hour period. The product was light colored, of medium viscosity, and contained a small amount of a second phase. The second phase, a solid, was probably due in part to the stearic acid content of the amidine, which acid tends to give amidines that are poorly soluble in organic solvents.

*Example 4g*

25.9 lb. of the product shown in Example 13c was mixed with 37.9 lb. of mineral spirits and charged as a part suspension into the sulfonator. 12 lb. of sulfur trioxide at a 7:1 air ratio was passed in over a two-hour period at a temperature of 70° C. A strong air:$SO_3$ concentration was used since more than 1 molal equivalent of $SO_3$ was introduced. Also, this ratio is more favorable for reaction between $SO_3$ and alcoholic OH radicals. The product was separated from the solvent as a water dispersible, viscous liquid. It was also dispersible in aromatic solvents, and soluble in alcohols.

*Example 5g*

In this example 24.2 lb. of product from Example 8e was mixed with 28.2 lb. of xylene. The batch was warmed to 75° C. and sulfur trioxide passed in at a 9:1 ratio. 4 lb. of $SO_3$ was used in one-half hour. The product was extremely viscous when cooled, and dark brown in color. On removal of the xylene, it was a hard solid.

*Example 6g*

As in Example 2g, 22.3 lb. of product 10aa was sulfonated with 4 lb. of gaseous sulfur trioxide. 26.3 lb. of xylene was used. The cooled product was a dark amber viscous liquid.

PART 7

As previously noted in the products obtained in Part 6 and particularly where one sulfo group is introduced into a cyclic amidine having plurality of basic nitrogen atoms it is possible to add a high molal acid or a low molal acid so as to form a salt with the residual basicity of a sulfonated cyclic amidine and thus change or alter its solubility in either oil or water so as to make the product more satisfactory for certain purposes. The sulfonated cyclic amidine properly selected can be reacted with low molal acids such as acetic acid, lactic acid, glycolic acid, propionic acid, diglycolic acid and the like. On the other hand one can use naphthenic acid, higher fatty acids, tall oil, sulfonic acids, and particularly oil soluble petroleum sulfonic acids such as mahogany acids to form salts. Examples 1H to 5H on Table VII immediately following show appropriate combinations between sulfonated cyclic amidines of the series 1g to 10g previously described and various acids to form suitable salts.

*Table VII*

| Ex. No. | Description |
|---|---|
| 1H | Of the product described as Example 1g, 82.8 grams were partially neutralized with 28 grams of oleic acid. The neutralization was conducted by mixing the two reactants together and then simply warming them to about 60° C. while stirring. The original product, prepared from acetic acid and tetraethylenepentamine, which tended to be hydrophile in some respects was thus converted to a product which was not water dispersible at all. Furthermore, the solubility in such solvents as gasoline and kerosine was improved by addition of the hydrophobe oleic acid. |
| 2H | To 28.1 gms. of the product called Example 3g were added 2 gms. of propionic acid. The reactants were held at 60° C. for 2 hrs. with constant agitation. The addition of this relatively minor amount of low molal acid caused a change in the properties of the sulfonated cyclic amidine such that it became a one phase product instead of a two phase product as previously described in Example 3g. |
| 3H | 24.2 gms. of product from Example 5g were mixed with 1.5 gms. of acetic acid and warmed together. Addition of the acetic acid caused the sulfonated cyclic amidine to become water dispersible to a fair degree, while its solubility in xylene seemed to be unaffected. |

PART 8

Part 8 is concerned with the improvement of hydrocarbon fuels by the addition of products described in Parts 6 and 7 preceding. Stated in another way, Part 8 is concerned with the addition of sulfonated cycloamidines as such or in the form of salts to fuel oils in order to improve their properties. As is well known a fuel oil additive should have demulsifying properties. Fuel oil stored in tanks is apt to accumulate water due to the so-called sweating of the tank. A number of demulsifying tests have been devised to evaluate such property and one of the simplest and most satisfactory is to shake a fuel oil sample with or without the additive in a ratio of 10 cc. of distilled water and 100 cc. of oil for a comparatively short period, such as for example, 15 seconds. We have subjected a No. 2 domestic heating oil to such tests and noted the amount of water which settled out after standing one-half hour. The results are indicated with a sample designated for convenience as heating oil Sample A in Table VIII following.

Table VIII

Relative demulsifying properties 10% water shaken with 100 cc. oil for 15 seconds.]

2 DOMESTIC HEATING OIL "A"

| Additive | Conc., p.p.m. | Percent Water Retained after ½ hr. |
|---|---|---|
| None | ---- | 95 |
| 1g | 50 | 50 |
| 1g | 150 | 15 |
| 2g | 50 | 30 |
| 2g | 150 | 3 |
| 3g | 50 | 37 |
| 3g | 150 | 2 |
| 4g | 50 | 22 |
| 4g | 150 | 35 |
| 5g | 50 | 65 |
| 5g | 150 | 20 |
| 10g | 50 | 25 |
| 10g | 150 | 5 |
| AA (Note 1) | 50 | 95 |
| AA (Note 1) | 150 | 95 |
| BB (Note 2) | 50 | 90 |
| BB (Note 2) | 150 | 72 |
| CC (Note 3) | 50 | 100 |
| CC (Note 3) | 150 | 100 |
| DD (Note 4) | 50 | 70 |
| DD (Note 4) | 150 | 35 |
| EE (Note 5) | 50 | 65 |
| EE (Note 5) | 150 | 18 |

Note 1: Imidazoline product derived from 1 mol diethylene triamine and 1 mol oleic acid.
Note 2: Imidazoline product derived from 1 mol diethylene triamine and 1 mol azeleic acid.
Note 3: Imidazoline product of Note "1" neutralized with sulfuric acid.
Note 4: Imidazoline product of Note "1" neutralized with Petronic Acid, a commercial product made by Sonnenborn & Sons, consisting of oil soluble aromatic sulfonic acids.
Note 5: Imidazoline product of Note "1" neutralized with dodecyl benzene sulfonic acid, a water soluble, oil "dispersible" aromatic sulfonic acid.

Another property which additives contribute to fuel oil is the property of rust inhibition. It has been previously noted that moisture collects in fuel tanks for an obvious reason. As a corollary thereto it follows that moisture in an iron container usually results in rusting or formation of a ferric coating which, for practical purposes, can be considered rusting. Actually, in the lower or water phase, resulting from the collection of water in the bottom of a tank, one accumulates rust whereas in the upper oil phase not only rust may appear but also some other characteristic change which is sometimes referred to as a blister.

Particular additives herein described contribute valuable rust inhibiting properties to the fuel oil. An ordinary steel plate was suspended in 100 cc. of oil for one week. The oils which were used had been shaken with water in a typical demulsifier test procedure as noted in connection with Table VIII preceding. Rust was determined by observation. The degree of rust in the various tests is rated from 1 to 5. As one can expect, the additives which gave pronounced demulsifying effects and thus eliminated the bulk of water from the fuel oil likewise in many instances were the most effective in anti-rusting action. It should be noted, however, that there are additives which have pronounced effectiveness as demulsifying agents but still for some obscure reason do not produce nearly as effective results in rust inhibition. The results are included in the following table.

RUST INHIBITION PROPERTIES

An ordinary steel plate was suspended in 100 cc. oil for one week. The additive treated oil had been shaken with 10 cc. of water before immersing the plate. Rust was determined by observation.

Table IX

The degree of rusting is rated from 1 to 5, which includes:

1—No rust
2—Few spots
3—Fair condition—rust occurring
4—Poor—much rust
5—Very poor—entire plate corroded

2 DOMESTIC HEATING OIL "A"

| Additive | Conc., p.p.m. | Rating Oil Phase | Rating Water Phase |
|---|---|---|---|
| None | ---- | 5 | 5 |
| 1g | 35 | 4 | 2 |
| 1g | 70 | 3 | 1 |
| 1g | 150 | 2 | 1 |
| 2g | 35 | 2 | 2 |
| 2g | 70 | 1 | 1 |
| 2g | 150 | 1 | 1 |
| 3g | 35 | 3 | 2 |
| 3g | 70 | 1 | 2 |
| 3g | 150 | 1 | 1 |
| 10g | 35 | 3 | 1 |
| 10g | 70 | 2 | 1 |
| 10g | 150 | 1 | 1 |
| AA | 35 | 5 | 5 |
| AA (Note 1) | 70 | 4 | 5 |
| AA (Note 1) | 150 | 2 | 3 |
| BB (Note 2) | 35 | 5 | 5 |
| BB (Note 2) | 70 | 4 | 4 |
| BB (Note 2) | 150 | 3 | 2 |
| CC (Note 3) | 35 | 5 | 5 |
| CC (Note 3) | 70 | 5 | 5 |
| CC (Note 3) | 50 | 5 | 5 |
| DD (Note 4) | 35 | 4 | 5 |
| DD (Note 4) | 70 | 2 | 3 |
| DD (Note 4) | 70 | 2 | 2 |
| EE (Note 5) | 35 | 3 | 2 |
| EE (Note 5) | 70 | 1 | 2 |
| EE (Note 5) | 150 | 1 | 1 |

Note 1: Imidazoline product derived from 1 mol diethylene triamine and 1 mol oleic acid.
Note 2: Imidazoline product derived from 1 mol diethylene triamine and 1 mol azelaic acid.
Note 3: Imidazoline product of Note "1" neutralized with sulfuric acid.
Note 4: Imidazoline product of Note "1" neutralized with Petronic Acid, a commercial product made by Sonnenborn & Sons, consisting of oil soluble aromatic sulfonic acids.
Note 5: Imidazoline product of Note "1" neutralized with dodecyl benzene sulfonic acid, a water soluble, oil "dispersible" aromatic sulfonic acid.

In previous tests reference was made to oil which was a domestic heating oil indicated as "A." In tests immediately following two oils were used. The second oil which has been indicated as domestic heating oil is "B." The most desirable property that an additive can contribute to fuel oil is the prevention of solids or sludges, and thus eliminate solids which act as screen-clogging precipitates. Needless to say, if a filter were used instead of a screen it means the prevention of precipitates or solids which would clog the filter. Stated another way, the additive prevents sludge formation, tar formation and the like. No effort is made to differentiate between formation of sludge and preventing its precipitation by acting as a suspending agent or an antiflocculent. A number of methods have been employed but one that has been established and has been frequently accepted is the procedure employed which the Shell Chemical Company in Bulletin SC 51-31 refers to as "The Small Scale Screen-Clogging Test."

PROPERTIES AS FUEL OIL INHIBITORS

These tests were run according to Shell Chemical Co. bulletin Small Scale Test.

An oil is "passed" if its flow decrease is less than 20% and its filter rating is "2" or less. In the test, the oil is steamed, aged at 194° F. for 16 hrs. and then passed through a screen at a constant flow head. The flow decreases, due to sediment or emulsion forming on the screen is noted over a half hour period. The residue from the aging bottle is filtered, and the filter stain rated as follows:

1—No stain
2—Slight stain
3—Dark stain
4—Heavy stain
5—Very heavy stain with actual sediment particles present The data obtained by these tests are shown in Table X immediately following.

Table X

#2 DOMESTIC HEATING OIL "A"

| Additive | Conc., p.p.m. | Percent Decrease | Filter |
|---|---|---|---|
| None | | 100 | 5 |
| 1g | 140 | 7 | 2 |
| 1g | 300 | 4 | 1 |
| 2g | 140 | 2 | 1 |
| 2g | 300 | 0.8 | 2 |
| 4g | 140 | 15 | 3 |
| 4g | 300 | 6 | 2 |
| 5g | 140 | 3 | 2 |
| 5g | 300 | 1.5 | 1 |
| 10g | 140 | 4 | 2 |
| 10g | 300 | 3 | 2 |
| AA (See Note 1) | 140 | 33 | 4 |
| AA (See Note 1) | 300 | 10 | 4 |
| BB (See Note 2) | 140 | 58 | 5 |
| BB (See Note 2) | 300 | 50 | 4 |
| CC (See Note 3) | 140 | 14 | 3 |
| CC (See Note 3) | 300 | 7 | 2 |
| DD (See Note 4) | 140 | 25 | 4 |
| DD (See Note 4) | 300 | 10 | 4 |
| EE (See Note 5) | 140 | 10 | 3 |
| EE (See Note 5) | 300 | 6 | 2 |

#2 DOMESTIC HEATING OIL "B"

| Additive | Conc., p.p.m. | Percent Decrease | Filter |
|---|---|---|---|
| None | | 48 | 3 |
| 1g | 140 | 2 | 2 |
| 1g | 300 | 2 | 2 |
| 2g | 140 | 1.8 | 2 |
| 2g | 300 | 1 | 1 |
| 4g | 140 | 6 | 2 |
| 4g | 300 | 4 | 2 |
| 5g | 140 | 3 | 3 |
| 5g | 300 | 2 | 2 |
| 10g | 140 | 5 | 3 |
| 10g | 300 | 2½ | 2 |
| AA (Note 1) | 140 | 25 | 3 |
| AA (Note 1) | 300 | 8 | 3 |
| BB (Note 2) | 140 | 31 | 3 |
| BB (Note 2) | 300 | 30 | 3 |
| CC (Note 3) | 140 | 5 | 2 |
| CC (Note 3) | 300 | 4 | 1 |
| DD (Note 4) | 140 | 15 | 3 |
| DD (Note 4) | 300 | 7 | 2 |
| EE (Note 4) | 140 | 10 | 2 |
| EE (Note 4) | 300 | 5 | 2 |

Note 1: Imidazoline product derived from 1 mol diethylene triamine and 1 mol oleic acid.
Note 2: Imidazoline product derived from 1 mol diethylene triamine and 1 mol azelaic acid.
Note 3: Imidazoline product of Note "1" neutralized with sulfuric acid.
Note 4: Imidazoline product of Note "1" neutralized with Petronic Acid, a commercial product made by Sonnenborn & Sons, consisting of oil soluble aromatic sulfonic acids.
Note 5: Imidazoline product of Note "1" neutralized with dodecyl benzene sulfonic acid, a water soluble, oil "dispersible" aromatic sulfonic acid.

It is to be noted that stabilization of hydrocarbon fuel as herein described may be accomplished within a low range of approximately 0.0025% to about 0.005%. On the other hand in numerous instances it is desirable to use a distinctly higher range as for example an amount of additive equal to 0.001 to 5% by weight of the fuel oil. See aforementioned U.S. Patent 2,553,183 and also U.S. Patent 2,711,947, dated June 28, 1955, to Smith et al. In actual use it is our preference generally to employ derivatives of the kind herein employed in 40 p.p.m. to 500 p.p.m. or ratios of 0.004% to 0.05%. It is convenient to make a solution of the additives such as a 25 or 50% solution in some suitable solvent such as high boiling aromatic solvent or the like and add a solution purely for convenience in measurement.

Having thus described our invention, what we claim as new and desire to obtain by Letters Patent, is:

1. A fuel oil composition comprising a major proportion of a hydrocarbon fuel oil and a minor amount sufficient to stabilize the fuel oil against the formation of sludge and undesirable color bodies of a member of the group consisting of sulfonated imidazolines and acid addition salts thereof in which the sulfur component is an organically combined part of the cationic imidazoline radical obtained by contacting an imidazoline selected from the class consisting of

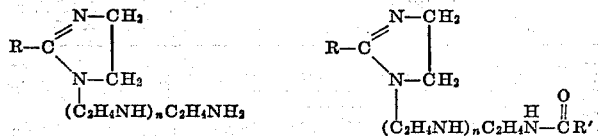

and

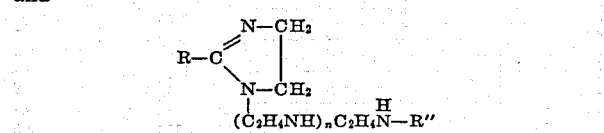

wherein R and R' are each a hydrocarbon group containing 1 to 21 carbon atoms, where $n$ is 0 to 2, and where R" is selected from the class consisting of hydroxyalkyl and hydroxyalkyleneoxy groups containing 2 to 9 carbon atoms, while dissolved in a hydrocarbon solvent, with sulfur trioxide diluted with air under sulfonation conditions including a temperature of 50–75° C. and an air to sulfur trioxide ratio by volume of 7 to 12:1.

2. The fuel oil composition of claim 1 wherein the sulfonated imidazoline is obtained from the imidazoline

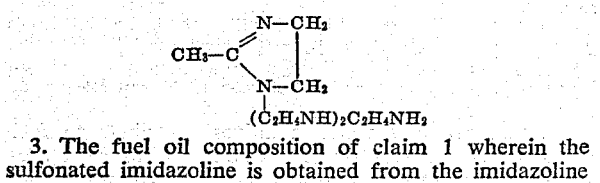

3. The fuel oil composition of claim 1 wherein the sulfonated imidazoline is obtained from the imidazoline

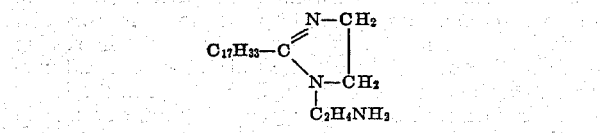

4. The fuel oil composition of claim 1 wherein the sulfonated imidazoline is obtained from the imidazoline

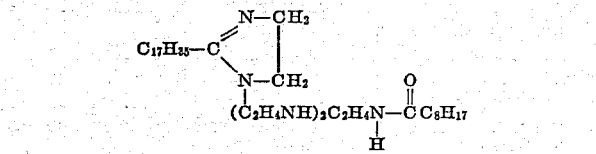

5. The fuel oil composition of claim 1 wherein the sulfonated imidazoline is obtained from the imidazoline

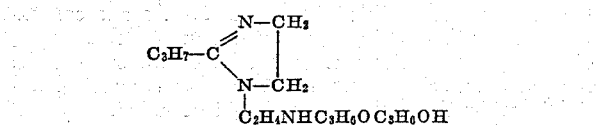

References Cited in the file of this patent

UNITED STATES PATENTS

| | | |
|---|---|---|
| Re. 23,227 | Blair et al. | May 9, 1950 |
| 2,296,069 | Talbert et al. | Sept. 15, 1942 |
| 2,553,183 | Caron et al. | May 15, 1951 |
| 2,640,029 | Blair et la. | May 26, 1953 |